Aug. 6, 1963 F. JONKER 3,100,296

SUPERIMPOSABLE CARD SEARCH AND DATA STORAGE SYSTEM

Filed Aug. 19, 1960 3 Sheets-Sheet 3

United States Patent Office 3,100,296

Patented Aug. 6, 1963

3,100,296

SUPERIMPOSABLE CARD SEARCH AND DATA STORAGE SYSTEM

Frederick Jonker, 3939 Legation St. NW., Washington, D.C.

Filed Aug. 19, 1960, Ser. No. 57,079
6 Claims. (Cl. 340—174.1)

This invention pertains to information retrieval systems based on the use of superimposable cards dedicated to terms, and the determination of coincidence of holes in said cards. These systems are also known as Peek-a-boo systems. Commercially they are known as Termatrex systems.

In the Termatrex systems, an item of information is prepared for entry into the system by first indexing it by a number of terms taken from a vocabulary of terms. Each item of information is given an accession number.

Termatrex systems comprise a number of cards each dedicated to a term. In total there will generally be a vocabulary of between 500 and 5,000 terms. On each term-card is a place dedicated to a document in the collection. Each document has the same position dedicated to it on each term-card.

Items of information are entered into a Termatrex system by selecting all of the term-cards by which that item has been indexed, placing these cards in superimposition in a Termatrex machine and drilling a hole in all of these cards simultaneously at the position dedicated to that item of information.

The system is searched by selecting a number of term-cards together describing a search question, and placing these in superimposition in a Termatrex machine. Next, a light in the bottom of the Termatrex machine is turned on. The coinciding holes in these term-cards are then visible as light dots. The serial numbers of these light dots can then be read-off one by one, for example, by means of a transparent grid with an $x$—$y$ coordinate system on it.

The dedication of space on the term-cards can be based on an $x$—$y$ coordinate system or any other suitable system. Terms can be any words, numerals or symbols or any combination of these.

The present invention provides a random access memory for digital and graphic data and based on magnetic as well as visible micro storage of information. This random access memory can be made an integrated part of the superimposable card search system, or it can be used without this search system. The system for recording information magnetically can also be applied to other forms of recording mechanisms.

The combination of search system, random access memory and reader of this memory, described in the present invention, can be placed on the corner of a desk and yet has the same storage capacity as magnetic disc memories costing ten times as much and occupying up to half a room. Moreover, this memory can be searched by an unskilled person. No coding of the search question is required. The time required for a search and readout of the results will be for less than that of a large, general purpose computer.

The manner in which this can be accomplished will be discussed with reference to the following figures.

Figures 10, 11, 14A, 14B, 15, 16, 17, 18, 19:
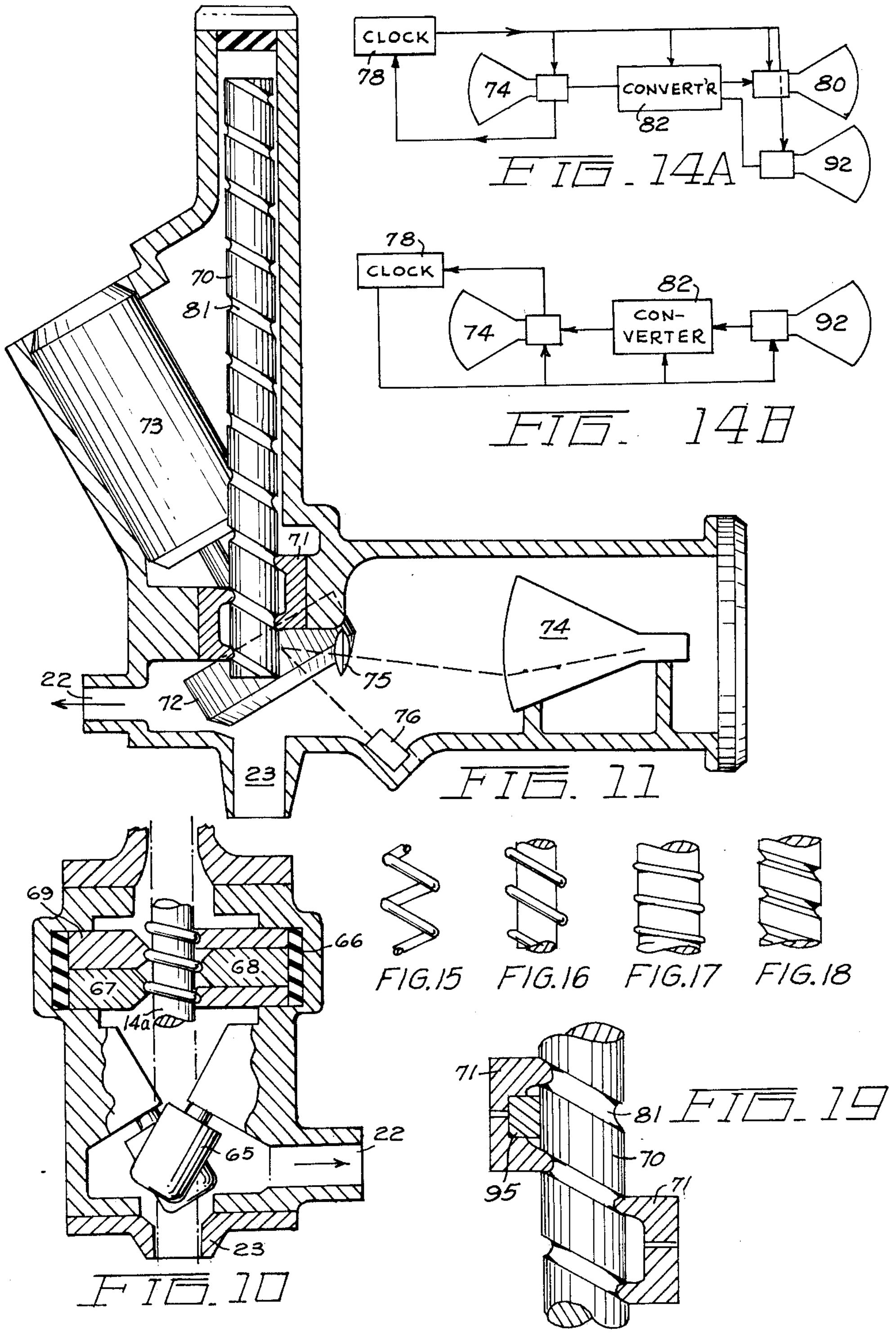
FIG. 10 shows an alternative to the device of FIG. 8.
FIG. 11 shows the scanning device in case graphic material is visibly recorded in microform.

FIGS. 14A and B show in block diagram the regulation circuitry required with the device of FIG. 11.

FIGS. 15 through 19 show the most important type of memory elements in detail.

Figure 1:
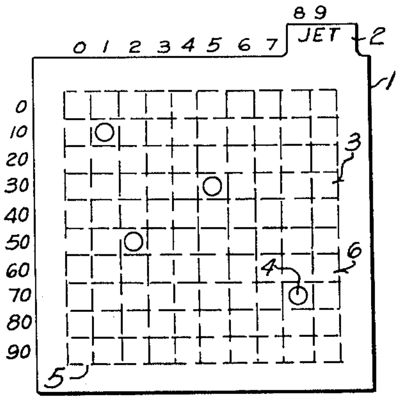
FIG. 1 shows an example of a superimposable card.

FIG. 1 shows an example of a term-card 1. The term "jet" to which it is dedicated is marked on the tab 2. Numerals 4 designate holes each representing an item of information indexed by the word "jet." The dedication of spaces on the cards is based on the grid 5 and the numerals along the $x$ and $y$ axis of this grid. For example space 3 is dedicated to item 39. Space 6 to item 69.

Actual term-cards in commercial use have a spacing of 12 positions to the inch and a total of 10,000 dedicated positions, arranged in a matrix of 100 x 100 positions.

Figure 3:
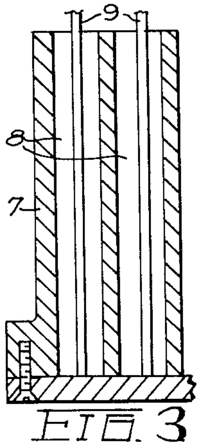
FIG. 3 shows the same for use without this search system.
Figure 2:
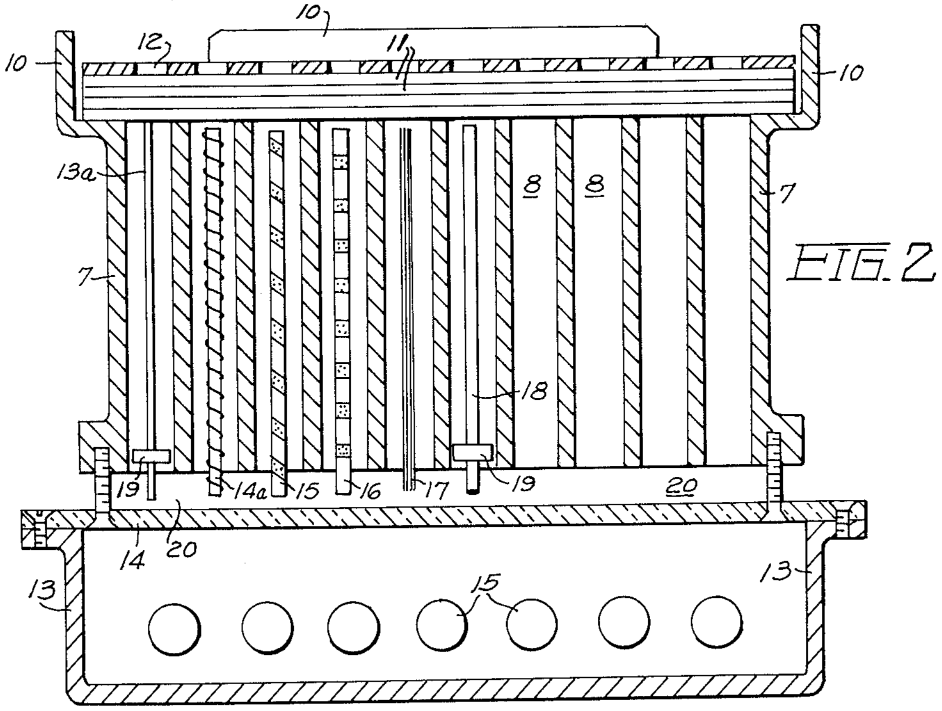
FIG. 2 shows, in cross section, the random access memory for use with superimposable card search.

FIG. 2 shows a cross section of the random access memory for use with superimposable cards. FIG. 3 shows it for use without the same. It comprises a body 7 containing parallel containers 8 having the same spacing as the dedication of position of the term-cards.

Figure 4:
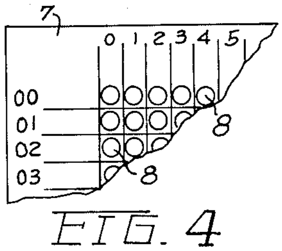
FIG. 4 shows an example of the way the memory containers of FIG. 3 are marked.

The memory elements consist of rod-like elements housed in containers 8. When used as a memory without the superimposable card search mechanism, the containers have to be clearly marked on the top of the housing 7, with the serial numbers of the containers or their coordinates as shown in FIG. 4, showing the top view of a corner of the top of the housing 7.

FIG. 2 shows the memory as used with superimposable card search. The top of the device is provided with bracket 10 to align the term cards 11. On top of the term-cards 11 is template 12, having a hole at a dedicated position.

Figures 5, 6, 7, 8, 9:
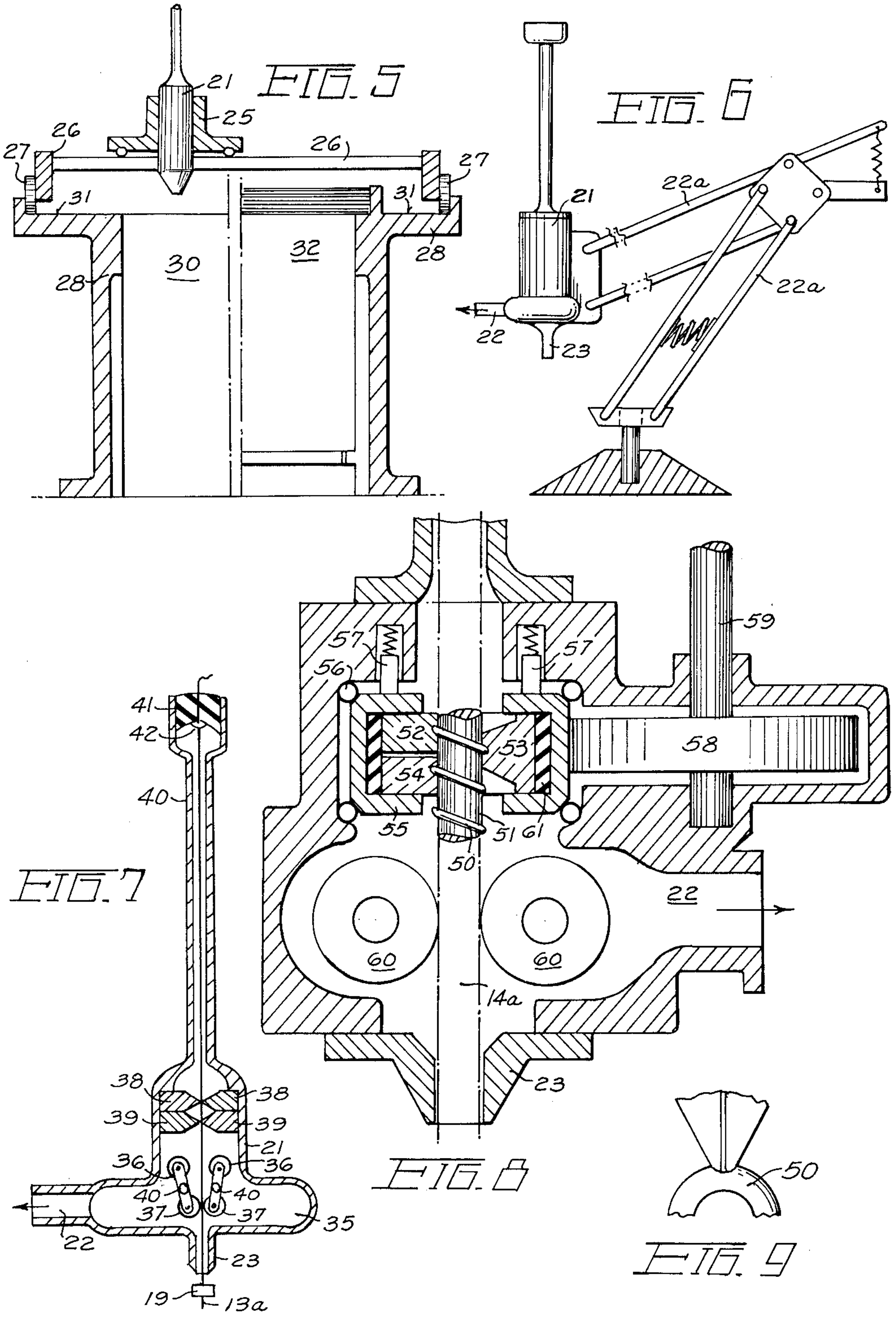
FIG. 5 shows the memory combined with a servoed automatic device to scan the desired memory rods.
FIG. 6 shows a manual device for the same purpose.
FIG. 7 shows schematically the scanning device to be used when straight magnetic wire is used for data storage.
FIG. 8 shows the scanner in case a spiral-like magnetic wire is used.
FIG. 9 shows a detail of the device of FIG. 8.

Instead of this manual procedure, the movement of the scanner can, for example be performed entirely automatically as schematically shown in FIG. 5. FIG. 5 shows a frame 28 with two aprons 31 on which a carriage 26 can travel back and forth on rollers 27. On top of this carriage is a movable carriage 25, movable in a perpendicular direction. The scanner 21 is mounted on carriage 25. The vertical movements of scanner 21 and the horizontal movements of carriages 25 and 27 are all servoed and controlled from a keyboard. Shown in FIG. 5 are the two different versions of the memory. Numeral 30 designates the memory without the search capability. Numeral 32, the memory with the search capability.

Underneath the memory of FIG. 2 is a lightbox 13, containing, for example, fluorescent lights 15, and having a translucent cover 14. There is an airspace 20 between the open bottom of the housing 7 and the lightbox 13.

When not used with superimposable cards, the memory rods 9 (in FIG. 3), can stick out above housing 7, so that they can be engaged by rollers or other suitable means to pull up the rods out of their containers. However, in most cases the spacing of the holes will so close that there will be no room for rollers to engage the rods. In the case of FIG. 2, air suction will therefore be utilized. Therefore, other means will generally be required. For this reason, air space 20 is provided and the thinner memory rods have been provided with a plunger, preferably transparent, so that the light from lightbox 13 can get through. Memory rod 13*a* in FIG. 2 has been provided with such a plunger 19.

Shown in FIG. 2 are a number of different memory elements which can be used with the memory. Numeral 13*a* designates a wire for magnetic recording. Numeral 14*a* designates a coil-like helix wire, also for magnetic recording. Numeral 17 designates a plurality of loose wires for magnetic recording. Numeral 18 designates a plurality of wires for magnetic recording tied together at the bottom. Numerals 15 and 16 designate memory rods having graphical and pictorial information in visible form, that is, microphotographic form, utilizing any suitable form of photography. Each of these different forms of memories requires a different scanner.

FIG. 7 shows the scanner for the single magnetizable wire. It can be mounted on the parallel guidance mechanism of FIG. 6 or on the servoed device of FIG. 5. This could comprise, for example, a pair of rollers 37 to pull up the wire and a pair of rollers 36 to replace it in its container. The rollers are mounted on a capstan 40 and are continuously driven but each pair in opposite directions. Therefore by tilting the capstan, the direction of movement of the wire is reversed. This capstan drive mechanism is well known in the art.

Suction is used to pull the wire 13*a* into the nozzle 23. Numeral 35 designates the suction scroll and 22 the opening where the suction pump is connected. Numerals 38 and 39 designate a pair of read and write coils. The reverse signal may be recorded on the wire or may come from a contact made at the end of its travel by wire 13*a* at contact 42. Instead of the capstan mechanism, reversible rollers or any other suitable drive mechanism could be used.

FIG. 8 shows a scanner that could be used with the coil-like memory element 14*a*. It could be simple or helical spring-like wire with or without a loose core, or a helical wire 50 embedded in a core 51 as shown in FIG. 8, or a rod coated with magnetizable material and a helical groove in it. In FIG. 8 memory 14*a* is sucked in through nozzle 23 and grabbed by rollers 60. These rollers are driven, and advance the memory 14*a* into the rotating magnetic head 55. This is running on roller bearings 56 driven by friction wheel 58. As soon as memory rod 14*a* engages the magnetic head and a first signal is received, the drive of the rollers 60 is automatically disconnected and the rollers then idle to prevent rotation of rod 14*a*. This could be accomplished by disengaging clutches. The rubber 61 acts as a spring element to insure sufficient presure of the magnetic heads against the wire. Shown are three heads, 52, 53 and 54, which could, for example, read, erase and write. A helical guide groove along the surface of these heads acts as a guide to the wire. FIG. 9 shows a detail of the tip of a magnetic head in engagement with the wire 50. Brushes 57 connect the heads 52, 53 and 54 with the read, write or erase electronics.

FIG. 10 shows a modification of the scanner of FIG. 8. The wire memory rod 14*a* is sucked in and grabbed by a plurality of motor driven rollers 65 which impart a spinning movement combined with a forward movement to it. The reading heads 67, 68 and 69 are pressed against the wire under pressure of a spring-like element such as, for example, the rubber 66. This assembly may contain one, two or three different heads 67, 68, 69 as shown in FIG. 10, which can serve as read, erase and write heads. A helical guide groove along the surface of these heads serves as a guide for the wire.

The various types of memory rods that can be used with the scanners of FIG. 8 and FIG. 10 are shown separately in FIGS. 15, 16, 17, and 18 and are respectively wire coil, coil wrapped around wire, wire wrapped or embedded in a core and a leadscrew-like rod.

FIG. 11 shows a memory rod 70 upon which graphic data such as drawings or print is visibly recorded in microform. After the rod 70 has been sucked in through nozzle 23, it is grabbed by a pair of rollers or some other suitable means imparts to it a spinning and forward motion. Shown in FIG. 11 is a roller 72 driven by motor 73. This motor must be reversable or two paris of disengageable rollers will have to be used, one for the upward and one for the downward motion. The motion of rod 70 is guided by guide nut 71 cooperating with notch 81 in rod 70.

This visible microform information is scanned by a cathode ray tube flying spot scanner, comprising the line sweep C.R.T. 74, a lens 75 and a photocell 76. The line sweep must be synchronized with the rotation of the memory rod 70. Since there will be slight variations in the rotation of the rod, due to the mechanical nature of the drive, the clock driving the sweep should receive a correction signal from the rod itself at either end of each sweep. This is schematically shown in the diagram of FIG. 14A in which numeral 78 represents the clock.

Figure 12:
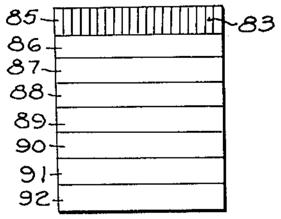
FIGS. 12 and 13 show how pictures can be recorded strung out in helical form.
Figure 13:
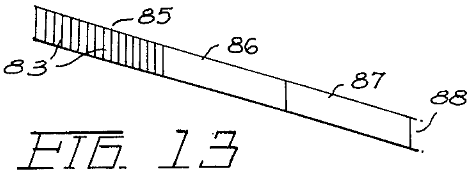

A picture is recorded on the rod by dividing into a number of strips and skewing it as shown in FIGS. 12 and 13. Thus the picture in FIG. 12 is broken up in sections 85, 86, 87, etc. which are skewed into parallelograms, placed behind each other and positioned around rod 70 in a spiral. The picture is recorded on the rod 70 which has been coated with a light sensitive material, by exposing by the flying spot of FIG. 11. To do this, the C.R.T. scanning the picture of FIG. 12 will have to scan the sections 85, through 91, one by one, with a vertical line sweep of a length equal to the width of one of these sections, as schematically shown in FIG. 12 by line 83. The larger the reduction used, the fewer the sections in which the picture will have to be broken up. In the extreme case, no break-up will be necessary.

The electronics interposed between the two C.R.T.'s will be named the converter. This converter must be able to work in either direction. The block diagram of FIG. 14 shows how in reading the scan from C.R.T. 74, the signal has to pass through the converter 82, to a C.R.T. with surface retention of the picture 80, well-known in the art.

FIG. 14B shows in block diagram the recording process. The lines and arrows show the synchronization signal coming from clock 78 going to the C.R.T. 74, the converter 82 and C.R.T. scanner 92.

It is of course also possible to combine magnetic storage and the visible microform storage, for example, in the manner shown in FIG. 19 where the visible storage is on the smooth sections of memory rod 70, and the magnetic storage in the grooves 81. The top and bottom sections of the guide nut 71 could have the read or write heads built in.

It is also possible to superimpose magnetic recording on top of the visible recording. Numeral 95 designates a magnetic head that could perform such a function.

A preferred embodiment of this invention is achieved by the use of the storage device of FIG. 5 in which the memory or storage comprises storage section 31 which is identical to that shown in FIG. 2 and wherein superimposable cards 11 are utilized in conjunction with helical record rod-like elements such as 14*a*. Above this storage section is located the record-readout head of FIG. 8 which is mounted upon a carriage capable of movement to any desired position in a horizontal plane above the storage section. As explained earlier in this specification, the record-readout head may be guided to the desired location by a servo mechanism controlled by a remote keyboard duplicating the locations of the stored information upon each of the elongated rods in the compartments. In this preferred embodiment the elongated rods are of the type illustrated in FIG. 2 designated 14*a* and each comprises a helical magnetizable wire (FIG. 16) for magnetically recording information thereon. From the structure of the head as illustrated in FIG. 8, information may be recorded upon, as well as read from the slender magnetizable rod 14*a*. In this preferred embodiment the rods are initially withdrawn from their respective compartments by means of a suction lift as explained previously in this specification. Although the preferred embodiment comprises essentially the device illustrated in FIG. 5 utilizing as the storage section the storage means illustrated in FIG. 2, and the magnetizable rods 14*a* of FIG. 2, with the details of the record and readout head shown in FIG. 8, many other modifications and embodiments are possible within the scope of this invention by the use of the different recording media as shown in FIG. 2, FIGS. 11 to 14, and FIGS. 15 to 19.

The invention is not limited to the embodiments or modifications shown, but encompasses all of the modifications and embodiments contained within the scope of the claims.

I claim:

1. A random access information storage and retrieval apparatus comprising a plurality of compartments, an elongated rod-like record member in each of said compartments, each of said rods capable of storing information thereon along its length, each of said rod-like members mounted for movement out of and into its compartment, a readout means including a movable head outside said compartments, means for moving said head to a position adjacent one end of any chosen one of said compartments, said head including suction means for initially withdrawing the elongated rod-like member from a chosen compartment, further means for moving said elongated rod-like member past said readout means as it is being withdrawn from its compartment, and means for thereafter returning said rod-like member into its compartment.

2. The apparatus as set forth in claim 1 in which each rod-like member is provided with a helical record track, and said head includes means for rotating the selected member as it is moved past the readout means.

3. The apparatus as set forth in claim 1 in which said readout means includes a magnetic playback head, and each said rod-like element is capable of storing thereon magnetic impulses.

4. The apparatus as set forth in claim 1 including means for supporting a plurality of superimposable cards having perforations positioned to coincide with certain of the compartments housing the elongated rod-like members.

5. The apparatus as set forth in claim 1 in which said rod-like members have information recorded upon them in optical fashion, and said readout means including a cathode-ray tube scanner for reading out the information recorded on said rod-like members.

6. The apparatus as set forth in claim 1 in which said rod-like members have information recorded upon them in both optical and magnetic fashion.

References Cited in the file of this patent

UNITED STATES PATENTS 2,842,754 Luhn ------------------ July 8, 1958